(12) United States Patent
Siqueiros

(10) Patent No.: US 12,722,561 B2
(45) Date of Patent: Sep. 1, 2026

(54) REMOVABLE DIVIDER APPARATUS

(71) Applicant: Fidelmar Siqueiros, Glendale, AZ (US)

(72) Inventor: Fidelmar Siqueiros, Glendale, AZ (US)

( * ) Notice: Subject to any disclaimer, the term of this patent is extended or adjusted under 35 U.S.C. 154(b) by 485 days.

(21) Appl. No.: 18/231,290

(22) Filed: Aug. 8, 2023

(65) Prior Publication Data

US 2025/0050798 A1 Feb. 13, 2025

(51) Int. Cl.

| | |
|---|---|
| ***B60P 7/14*** | (2006.01) |
| ***A47B 3/083*** | (2006.01) |
| ***A47C 13/00*** | (2006.01) |
| *A47B 3/08* | (2006.01) |

(52) U.S. Cl.

CPC ................ *B60P 7/14* (2013.01); *A47B 3/083* (2013.01); *A47C 13/00* (2013.01); *A47B 2003/0827* (2013.01); *A47B 2003/0835* (2013.01)

(58) Field of Classification Search

CPC ... A47B 2003/0827; A47C 13/00; B60P 7/14; B60P 7/0892; B60P 7/135; B60R 9/06; B64D 9/003; B64D 1/10; B64D 37/04; B64D 11/003; B64C 1/20; B63B 25/00; B63B 25/24; B63B 2025/285

USPC ........................................................ 296/186.5

See application file for complete search history.

(56) References Cited

U.S. PATENT DOCUMENTS

| | | | | |
|---|---|---|---|---|
| 2,903,313 | A * | 9/1959 | Block | A47B 3/083 108/167 |
| 5,009,170 | A * | 4/1991 | Spehar | A47B 3/10 108/132 |
| D347,611 | S | 6/1994 | Phillips | |
| 5,967,054 | A | 10/1999 | Rosenfeld | |
| 6,550,836 | B2 | 4/2003 | Rigan | |
| 6,942,269 | B2 | 9/2005 | Mains | |
| 8,757,694 | B1 * | 6/2014 | Kuhnle | B62D 33/0273 296/26.11 |
| 11,014,487 | B2 | 5/2021 | Loew | |
| 2015/0307016 | A1 | 10/2015 | Payne | |
| 2024/0349883 | A1 * | 10/2024 | Yang | A47B 3/091 |

FOREIGN PATENT DOCUMENTS

| | | |
|---|---|---|
| CA | 2203739 | 4/1997 |

* cited by examiner

*Primary Examiner* — Daniel J Colilla

(57) ABSTRACT

A removable divider apparatus for partitioning a cargo space of a pickup truck bed includes a barrier comprising a pair of panels which are pivotally interconnected. A plurality of supports is provided, with each support of the plurality of supports movably attached to one of the pair of panels between a deployed position and a stored position. When the supports are positioned in the deployed position, the divider apparatus may be used as a table, bench, or the like to support items spaced from a support surface.

16 Claims, 13 Drawing Sheets

10
28
34
48
48
14
7
12

66
68
32
28
64
70
16
24
10
20
12
14
18
18
16
20
68
60
66
32
28
64
14

12
14
10
28
30

14
12
10
28
30

REMOVABLE DIVIDER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to divider apparatuses and more particularly pertains to a new divider apparatus for partitioning a cargo space of a pickup truck bed.

(2) Description of Related Art Including Information Disclosed Under 37 CFR 1.97 and 1.98

The prior art describes several divider apparatuses for partitioning a cargo space of a pickup truck bed. Most pertinently, U.S. Pat. App. No. 2015/0307016 describes a divider apparatus comprising two pivotally interconnected panels with extension members which slide relative to the panels to adjust a length of the divider apparatus. The divider apparatus is used by fitting into slots in the sidewalls of the pickup truck bed. However, the prior art does not describe such an apparatus which also includes deployable supports for using the divider apparatus as a table, bench, or similar support means. Such an apparatus is advantageous over the prior art because of the enhanced number of functions of the apparatus provided by the deployable supports.

BRIEF SUMMARY OF THE INVENTION

An embodiment of the disclosure meets the needs presented above by generally comprising a barrier comprising a pair of panels. Each panel of the pair of panels has a first edge and a second edge and further has a first side and a second side positioned opposite each other and extending between the first edge and the second edge. The first edges of the pair of panels are pivotably interconnected, and the barrier is positionable in an expanded condition in which the first sides of the pair of panels are oriented coplanar with each other and face a same direction with respect to each other. A plurality of supports is coupled to the barrier. Each support of the pair of supports is coupled to an associated panel of the pair of panels and is pivotable between a stored position in which the support lies against the second side of an associated one of the pair of panels and a deployed position in which the support extends away from the panel. The plurality of supports is configured to space the barrier above a support surface when each support of the plurality of supports is positioned in the deployed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
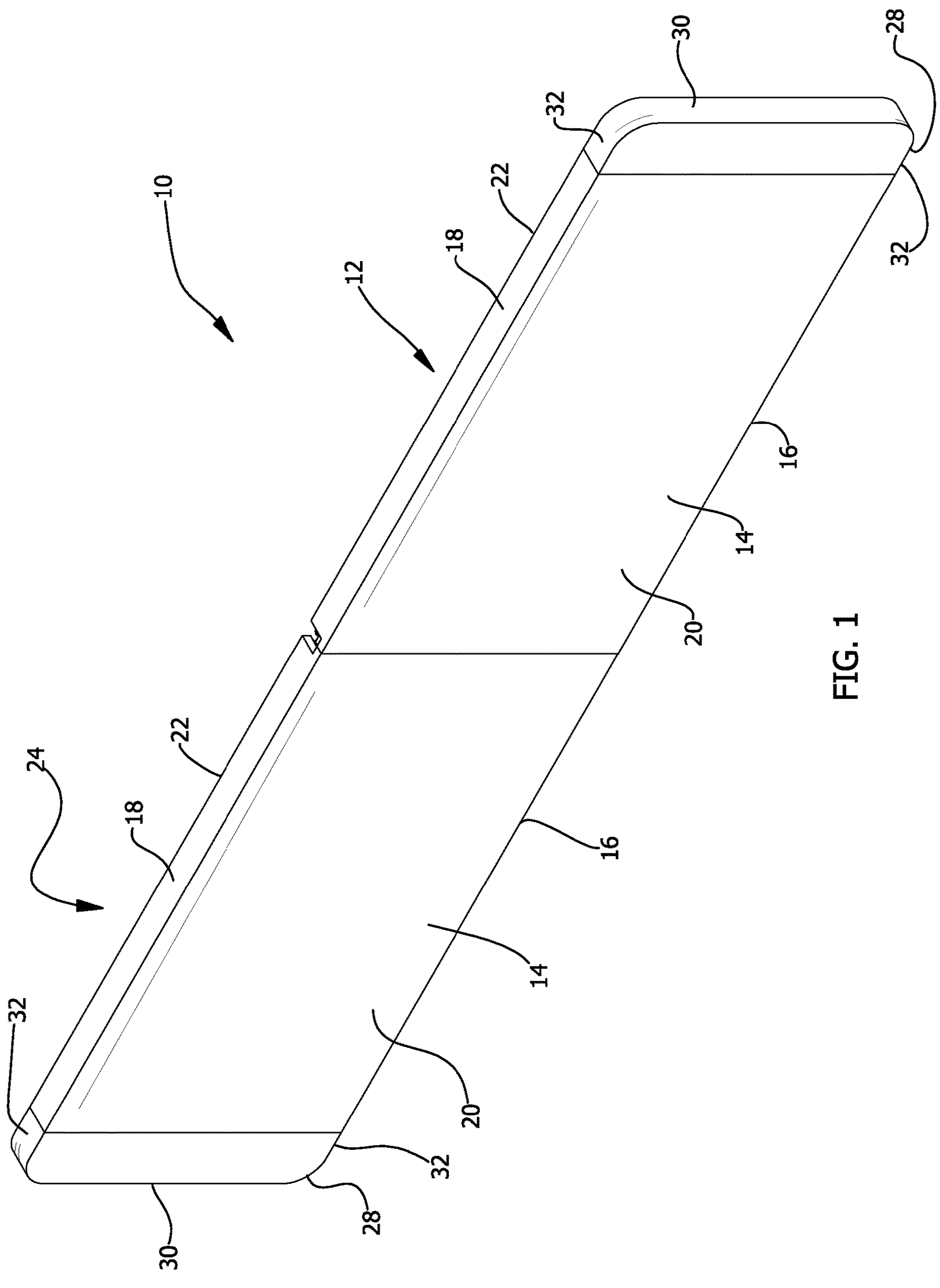
FIG. 1 is a front perspective view of a removable divider apparatus according to an embodiment of the disclosure.
Figure 2:
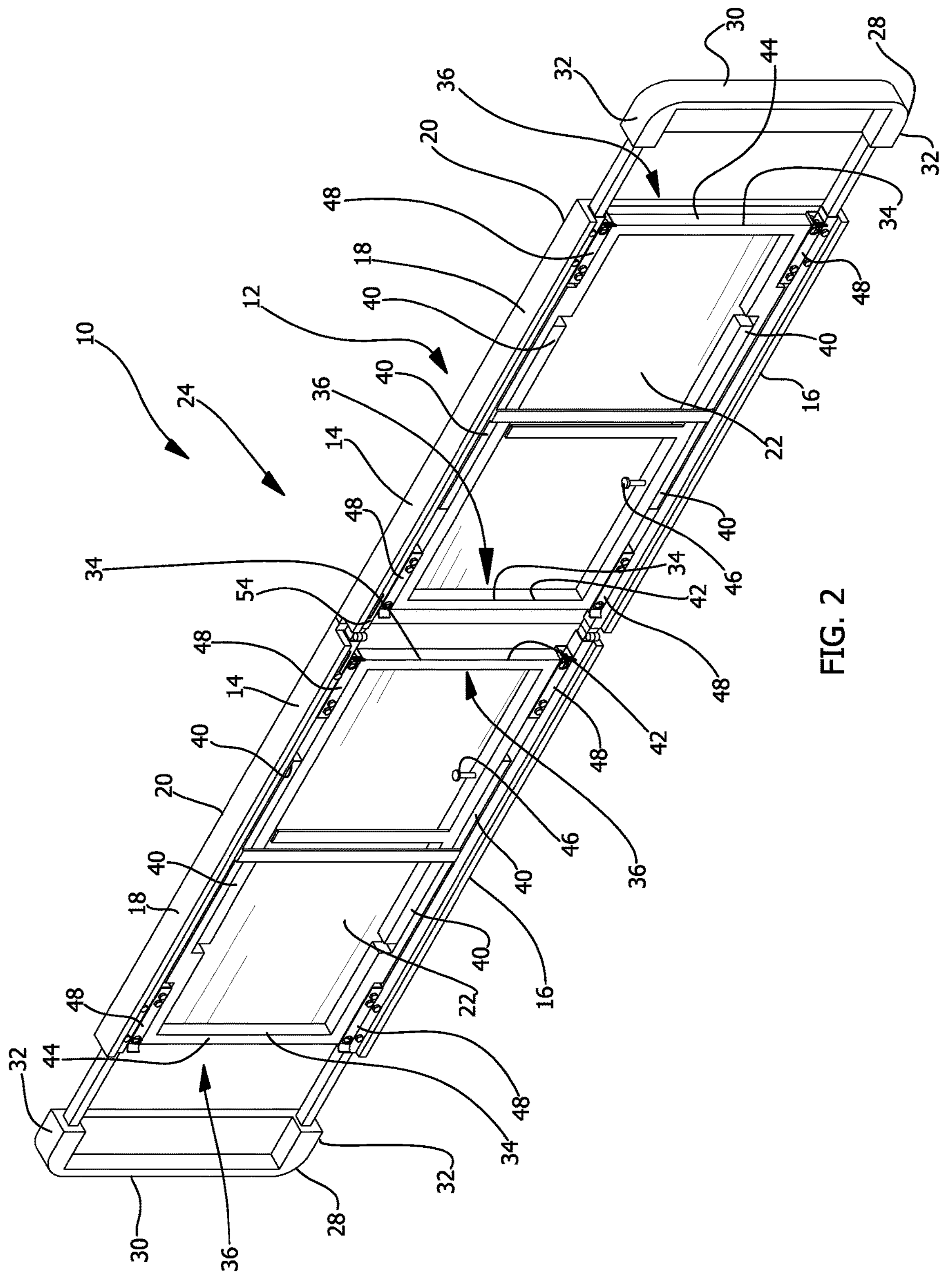
FIG. 2 is a rear perspective view of an embodiment of the disclosure.
Figure 3:
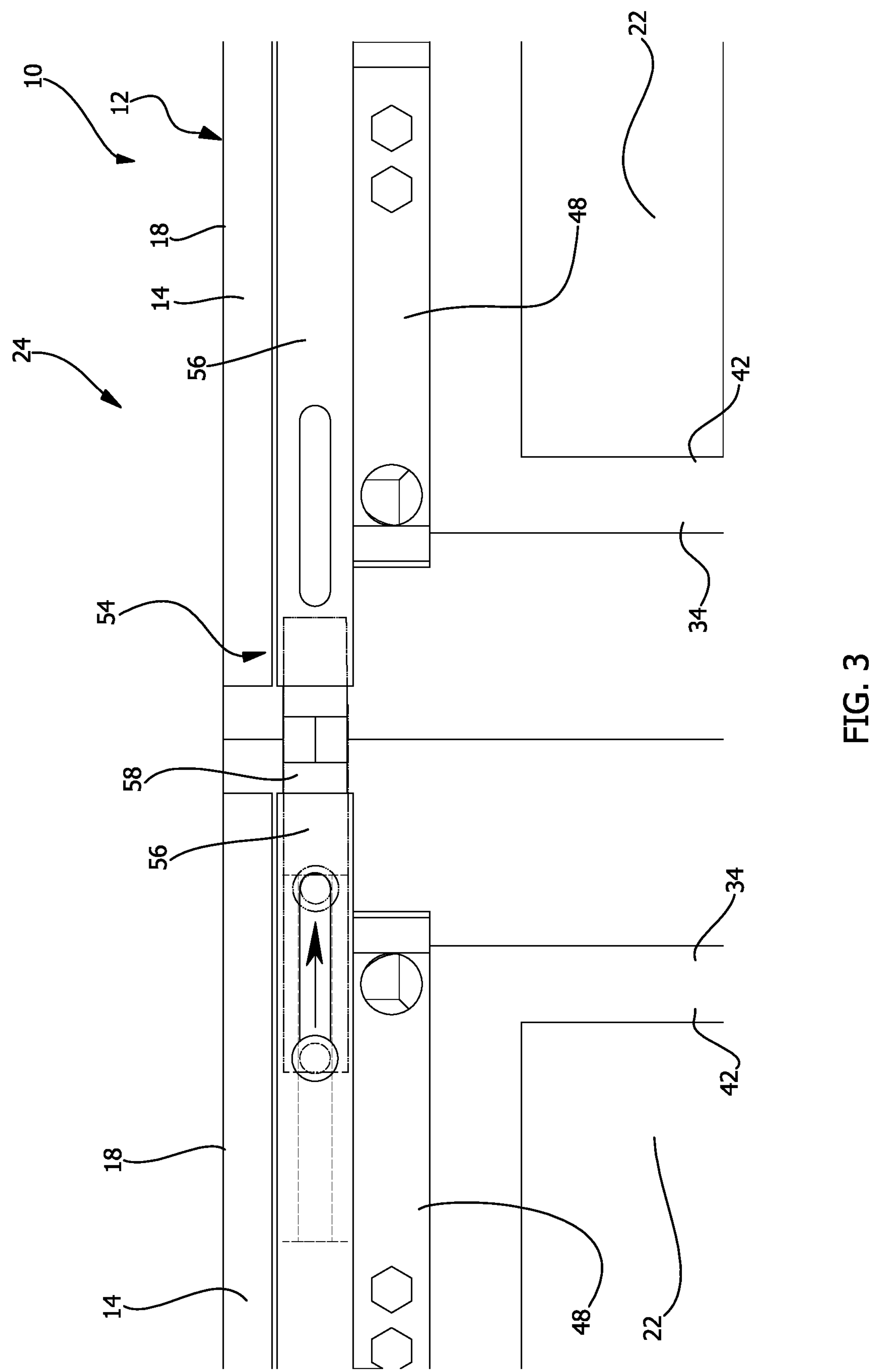
FIG. 3 is a detail view of a barrier lock of an embodiment of the disclosure.
Figure 4:
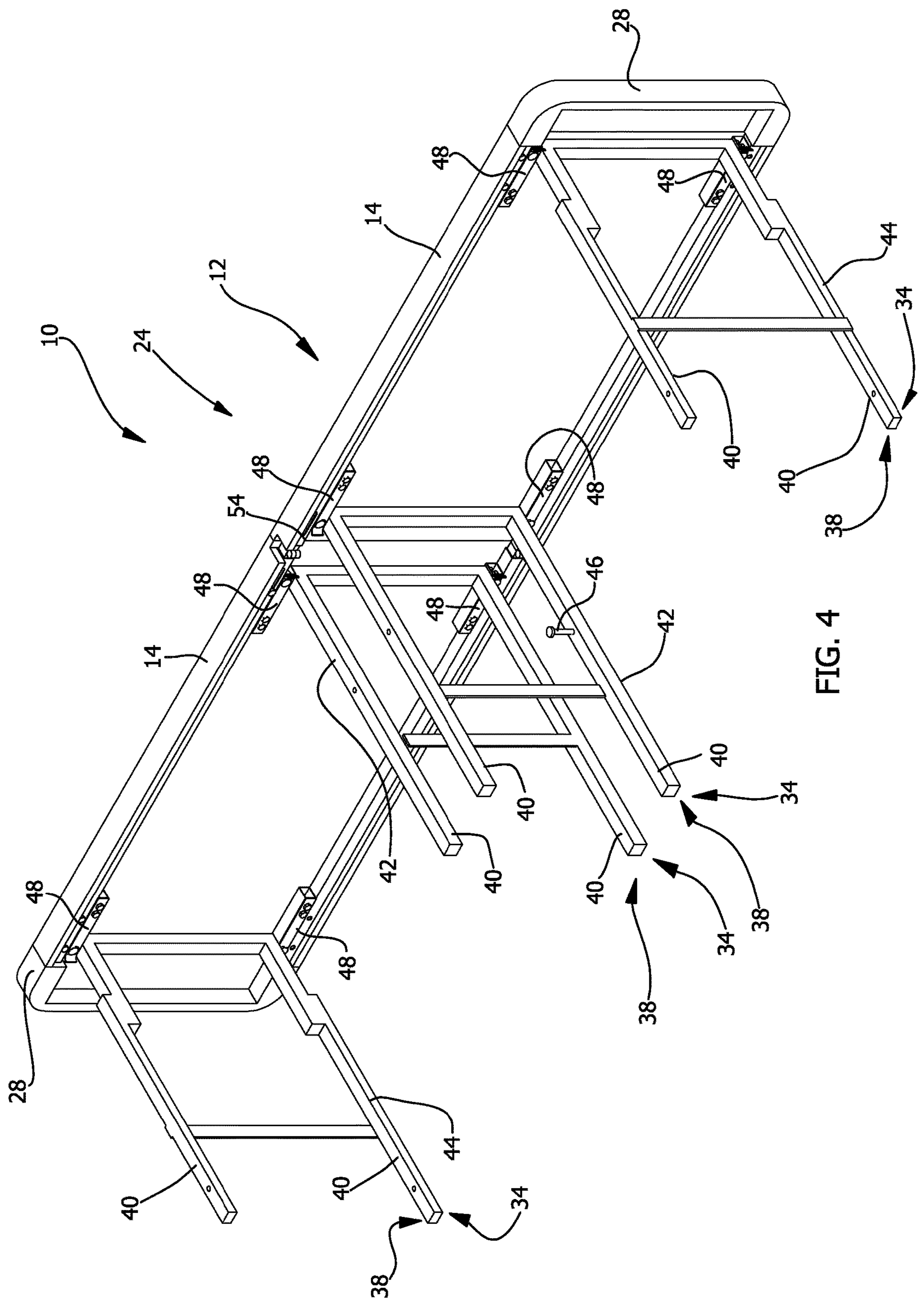
FIG. 4 is a rear perspective view of an embodiment of the disclosure with a plurality of supports positioned in deployed positions.
Figure 5:
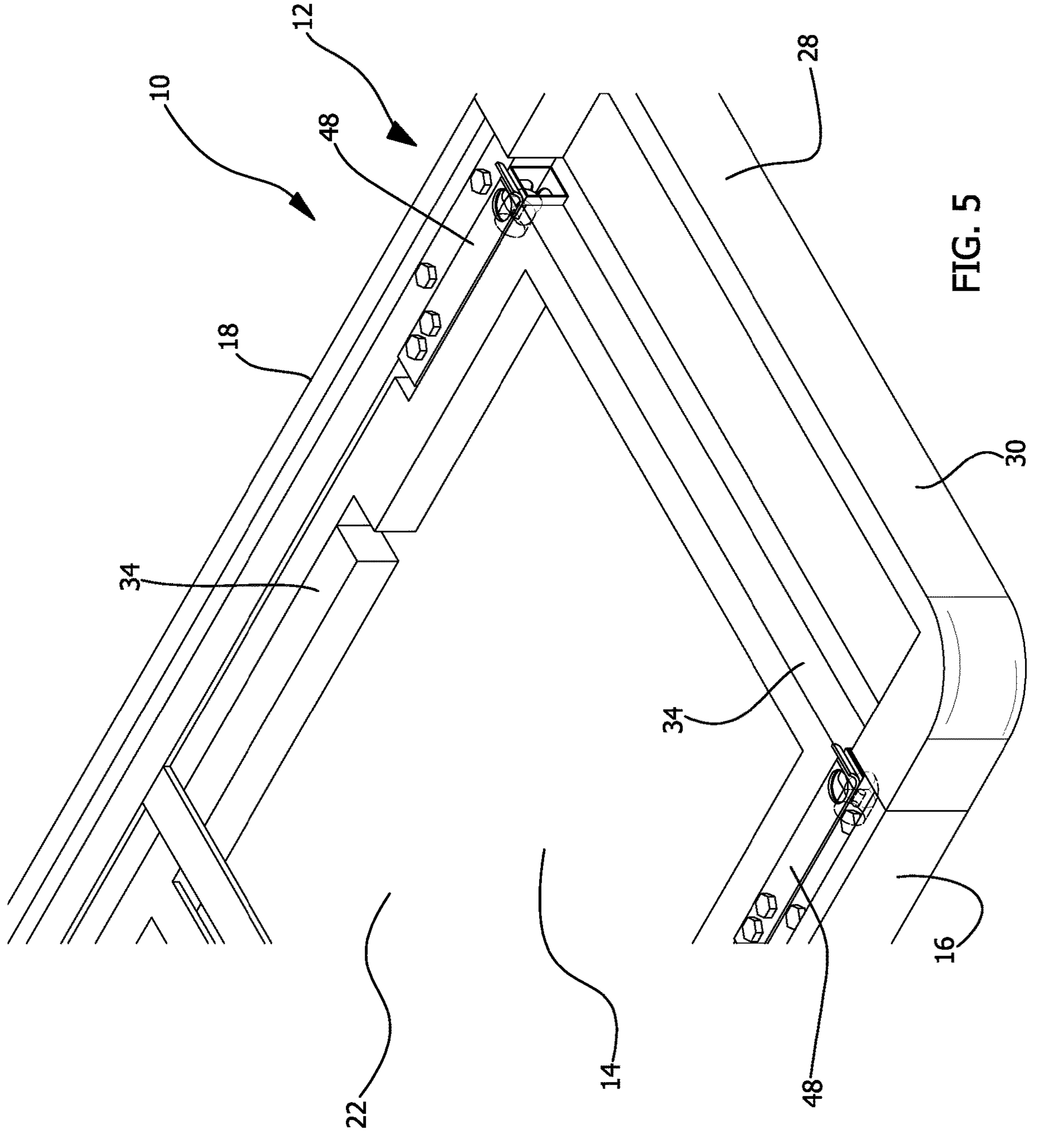
FIG. 5 is a detail perspective view of a pair of support locks of an embodiment of the disclosure with an associated support being positioned in a stored position.
Figure 6:
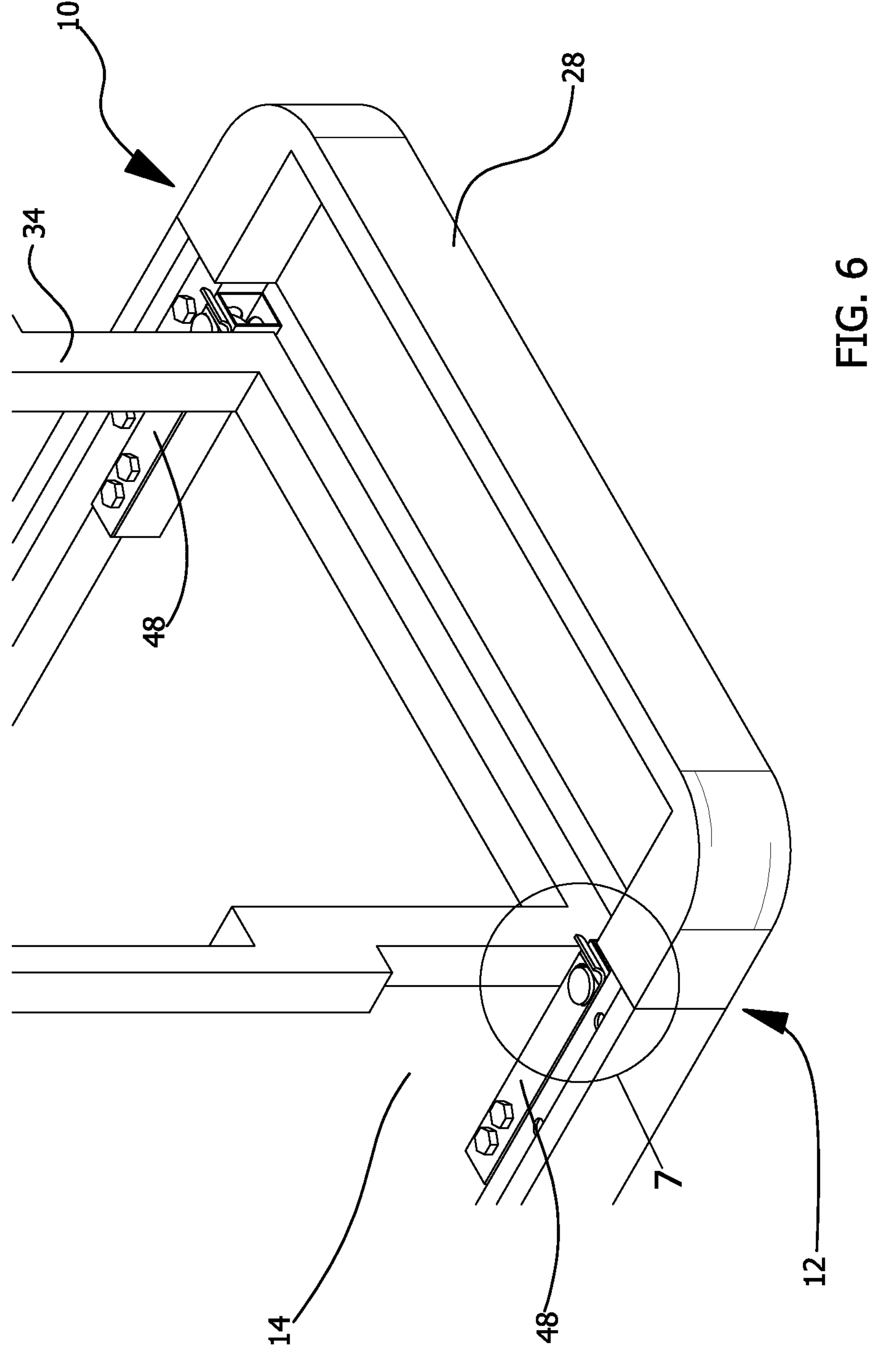
FIG. 6 is a detail perspective view of a pair of support locks of an embodiment of the disclosure with an associated support being positioned in a deployed position.
Figure 7:
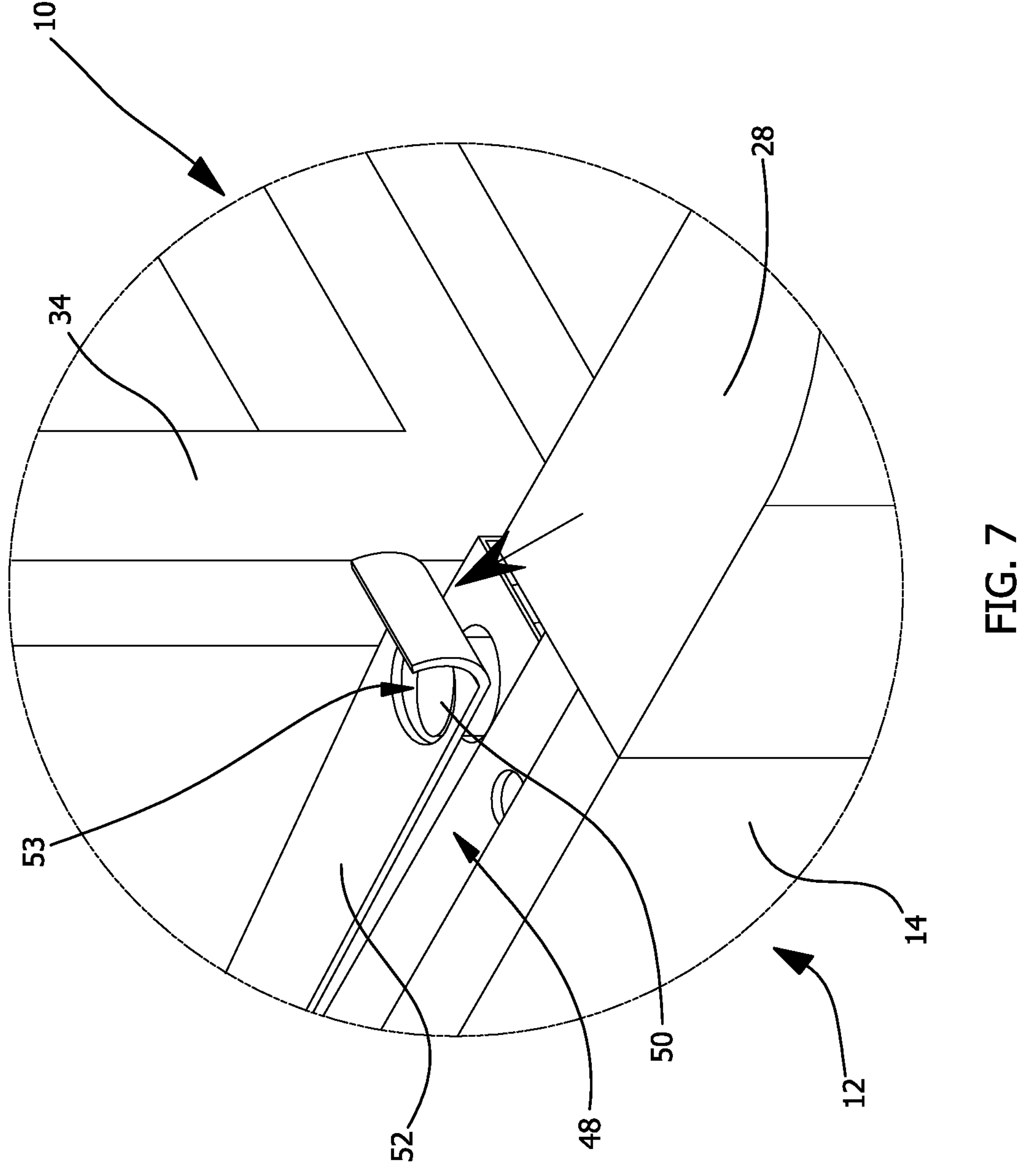
FIG. 7 is a detail perspective view taken from FIG. 6 of a support lock of an embodiment of the disclosure with an associated support being positioned in a deployed position.
Figure 8:
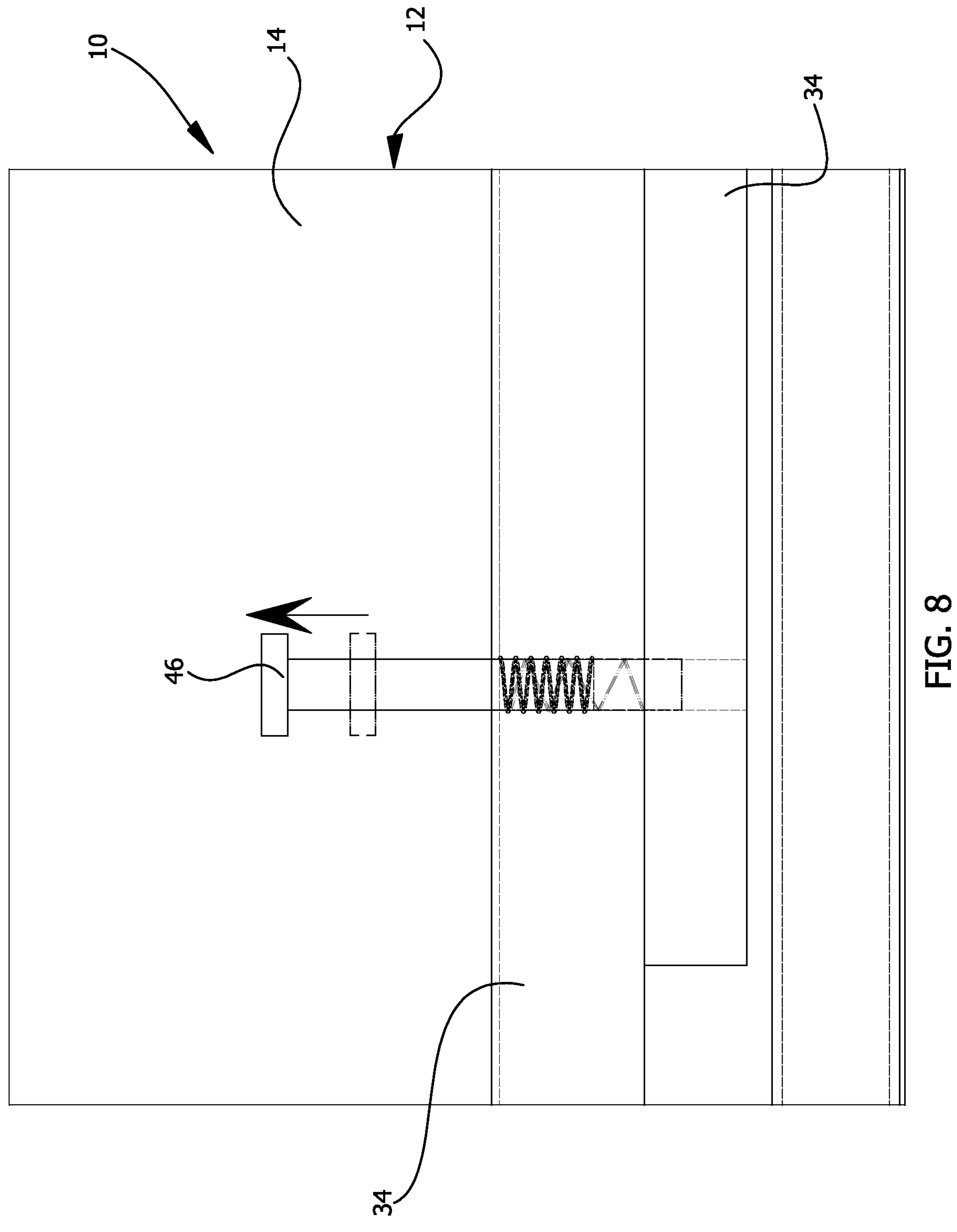
FIG. 8 is a detail view of a support pin of an embodiment of the disclosure.
Figure 9:
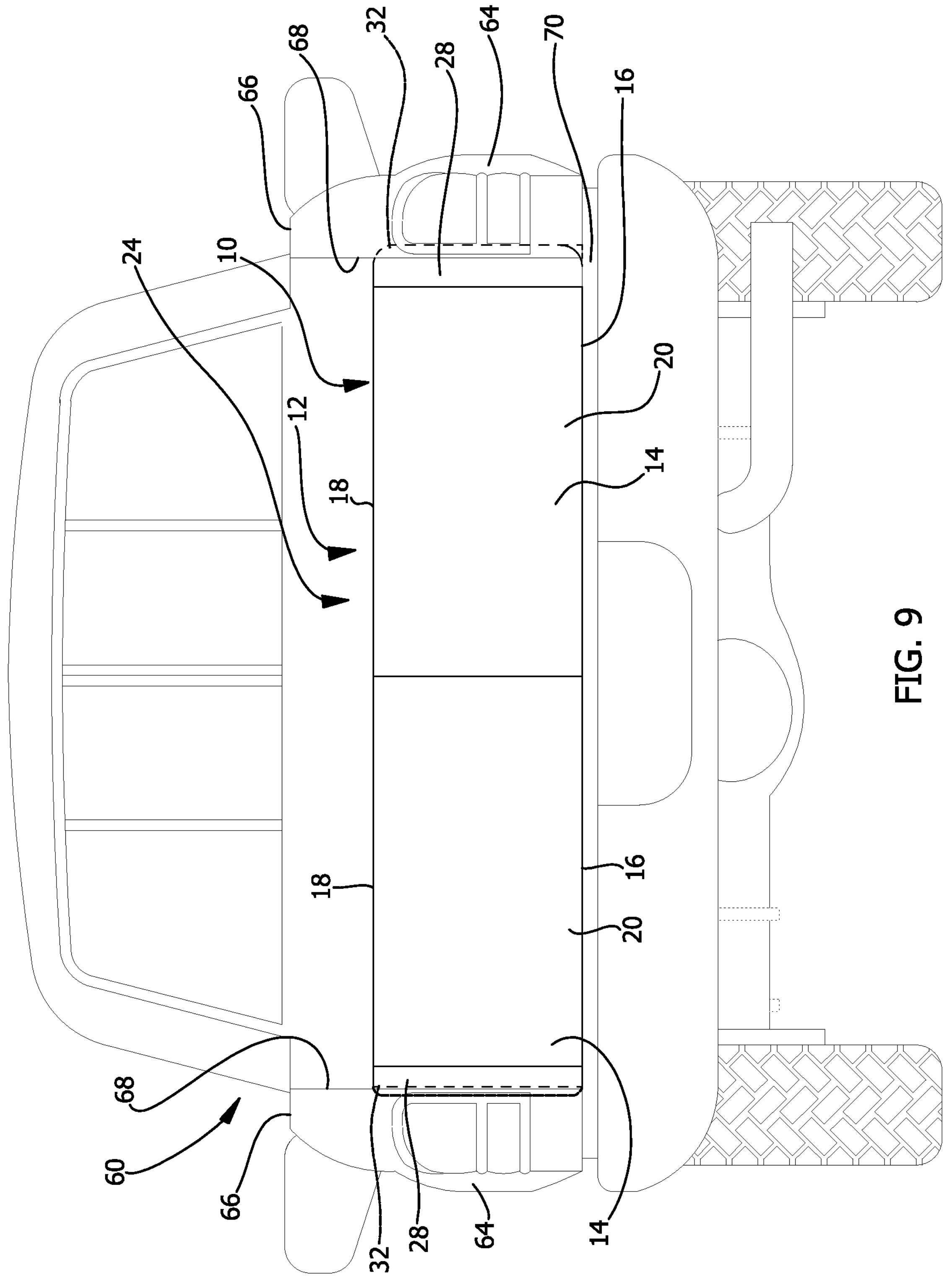
FIG. 9 is a rear in-use view of an embodiment of the disclosure.
Figure 10:
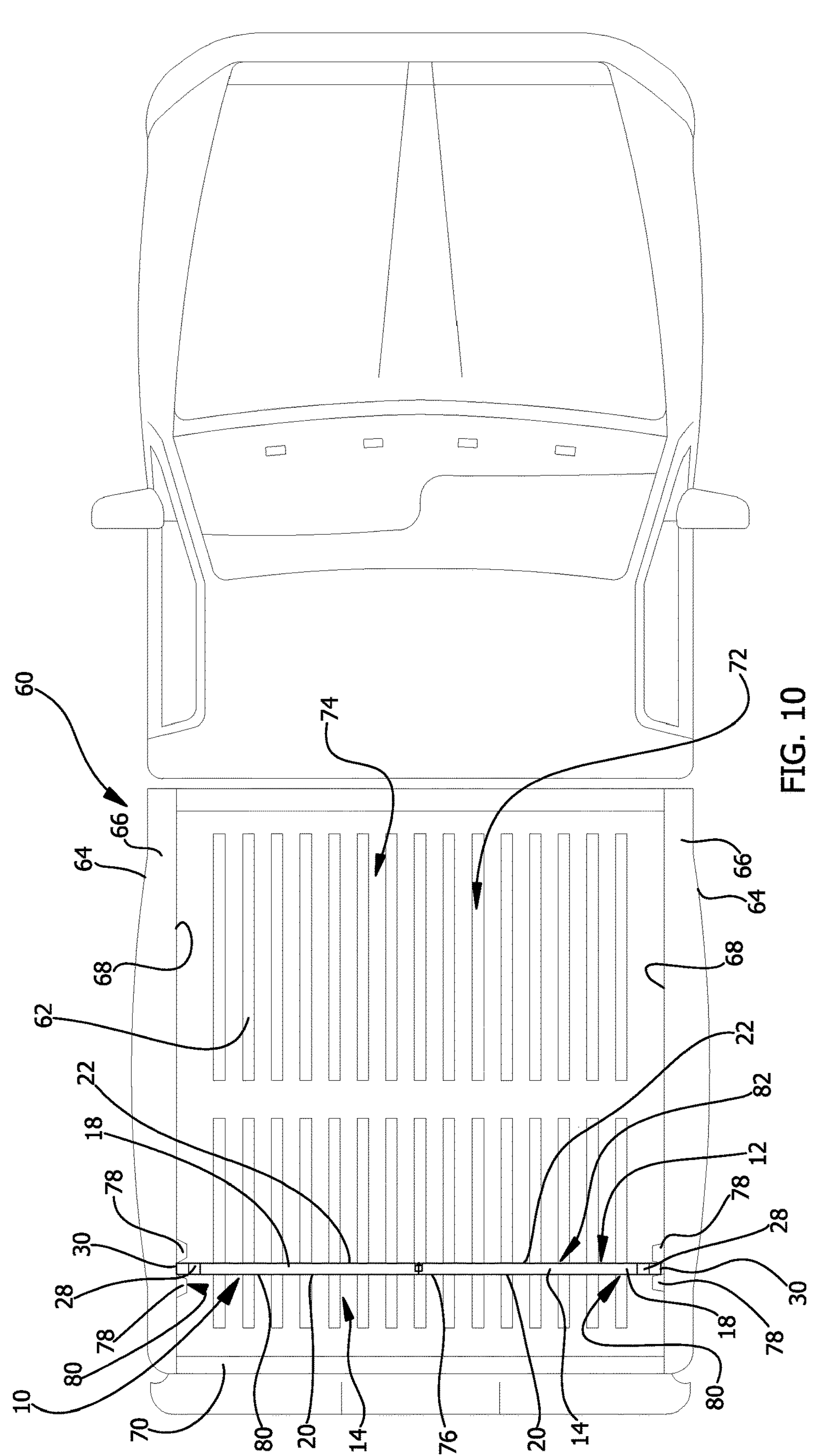
FIG. 10 is a top in-use view of an embodiment of the disclosure.
Figure 11:
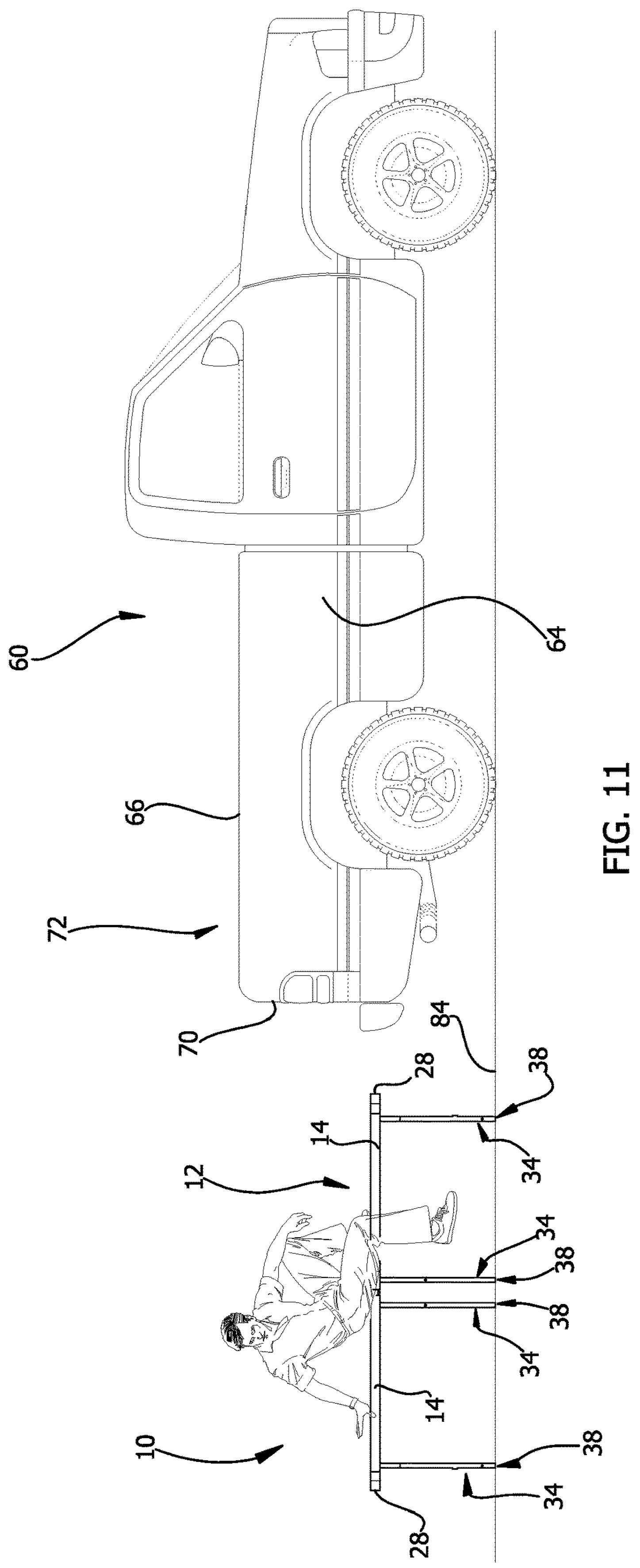
FIG. 11 is a side in-use view of an embodiment of the disclosure.
Figure 12:
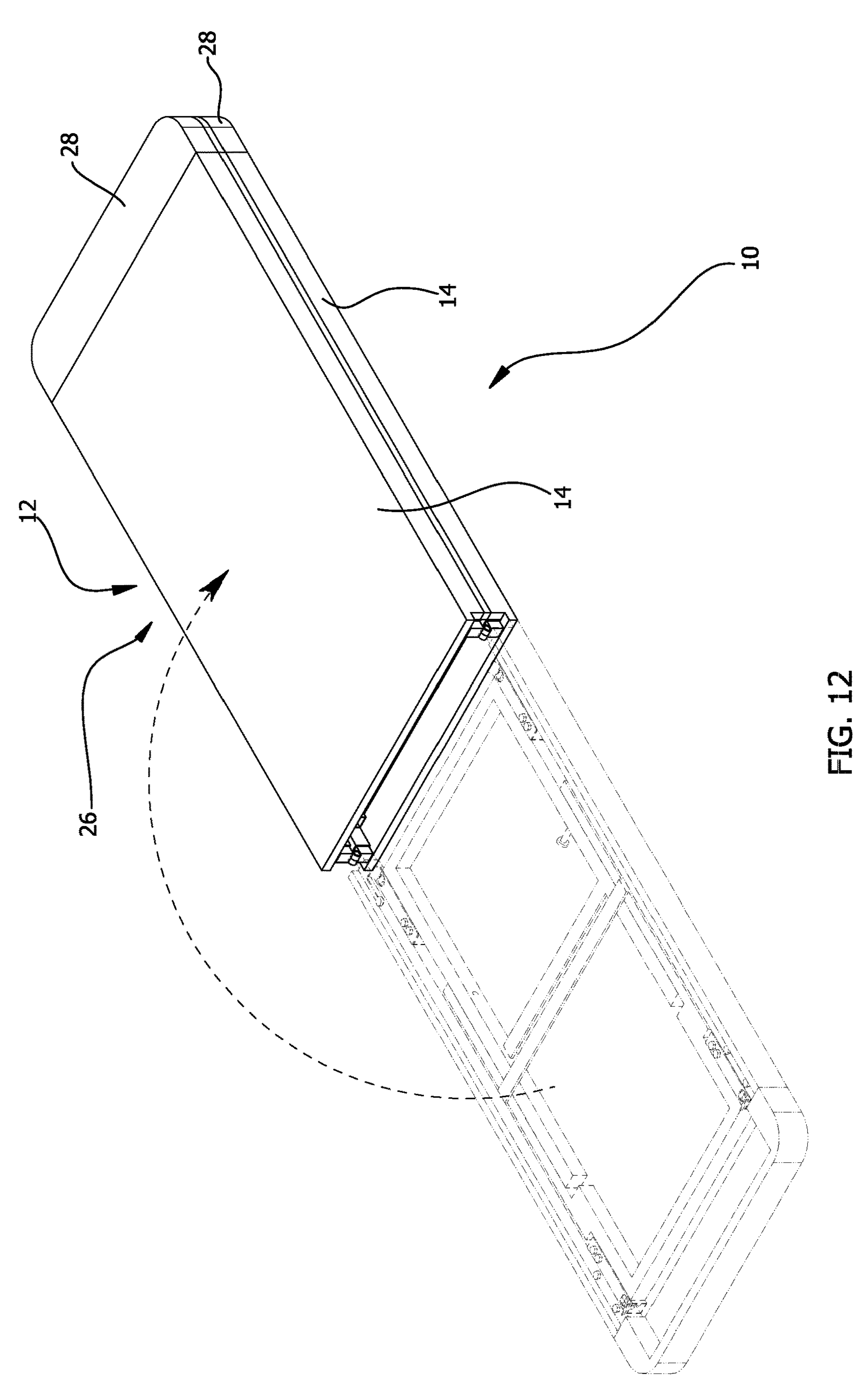
FIG. 12 is a perspective view of an embodiment of the disclosure being folded into a folded condition.

With reference now to the drawings, and in particular to FIGS. 1 through 6 thereof, a new divider apparatus embodying the principles and concepts of an embodiment of the disclosure and generally designated by the reference numeral 10 will be described.

As best illustrated in FIGS. 1 through 6, the removable divider apparatus 10 generally comprises a barrier 12 comprising a pair of panels 14 and a pair of slider members 28. Each panel 14 of the pair of panels 14 has a first edge 16 and a second edge 18 and further has a first side 20 and a second side 22 positioned opposite each other and extending between the first edge 16 and the second edge 18. The first edges 16 of the pair of panels 14 are pivotably interconnected. The barrier 12 is positionable in an expanded condition 24 in which the first sides 20 of the pair of panels 14 are oriented coplanar with each other and face a same direction with respect to each other. The barrier 12 is also positionable in a folded condition 26 in which the first sides 20 of the pair of panels 14 face opposite directions with respect to each other. Each slider member 28 of the pair of slider members 28 is coupled to an associated panel 14 of the pair of panels 14. Each slider member 28 of the pair of slider members 28 is movable alternately toward and away from the second edge 18 of the associated panel 14 to adjust a length of the barrier 12.

The length of the barrier 12 when in the expanded condition 24 is such that the barrier 12 is configured to extend between a pair of sidewalls 64 of a pickup truck bed 60. A distal surface 30 of each slider member 28 of the pair of slider members 28 with respect to the associated panel 14 is shaped such that the distal surface 30 is configured to conform to an inner surface 68 of an associated sidewall 64 of the pair of sidewalls 64 of the pickup truck. For example, in some embodiments, such as that depicted in FIG. 13, the distal surface 30 of each slider member 28 of the pair of slider members 28 extends between and is oriented perpendicularly to a pair of opposing edges 32 of the slider member 28. Such a barrier 12 would conform to a pickup truck bed 60 wherein the inner surfaces 68 of the sidewalls 64 are oriented perpendicularly to a base 62 of the pickup truck bed 60.

Figures 13, 14:
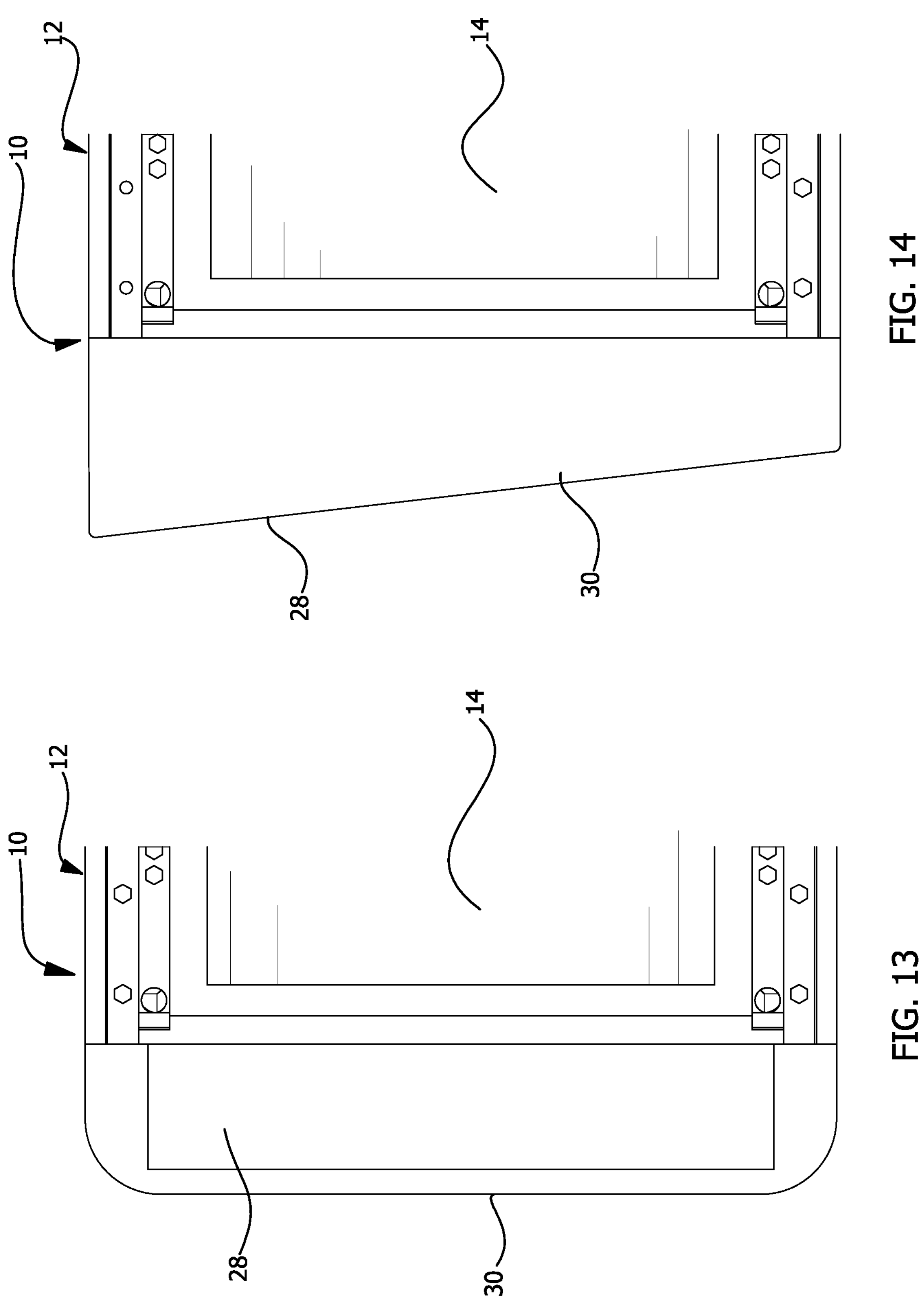
FIG. 13 is a detail view of a slider member of an embodiment of the disclosure.
FIG. 14 is a detail view of a slider member of an embodiment of the disclosure.

In reference to FIG. 14, in other embodiments the distal surface 30 of each slider member 28 of the pair of slider members 28 extends between a pair of opposing edges 32 of the slider member 28, forming an acute angle with one of the pair of opposing edges 32 and an obtuse angle with another of the pair of opposing edges 32. A shape of the barrier 12 in such embodiments would be trapezoidal and would conform to the inner surfaces 68 of the sidewalls 64 of a pickup truck bed 60 wherein the inner surfaces 68 of the sidewalls 64 are angled outwardly from the base 62 of the pickup truck bed 60 to upper ends 66 of the sidewalls 64.

The barrier 12 is also configured to be positioned in a bay 82 formed by a pair of slots 80 defined in the pair of sidewalls 64 of the pickup truck when the barrier 12 is positioned in the expanded condition 24, the barrier 12 having a thickness when positioned in the expanded condition 24 such that the barrier 12 may be securely positioned in the bay 82.

A plurality of supports 34 is coupled to the barrier 12. Each support 34 of the pair of supports 34 is coupled to an associated panel 14 of the pair of panels 14 and is pivotable between a stored position 36 in which the support 34 lies against the second side 22 of an associated one of the pair of panels 14 and a deployed position 38 in which the support 34 extends away from the panel 14. The plurality of supports 34 is configured to space the barrier 12 above a support surface 84 when each support 34 of the plurality of supports 34 is positioned in the deployed position 38. Each support 34 of the plurality of supports 34 comprises a pair of spaced legs 40.

The plurality of supports 34 includes a pair of outer supports 42 and a pair of inner supports 44. Each outer support 42 of the pair of outer supports 42 is coupled to an associated panel 14 of the pair of panels 14 adjacent to the second edge 18 of the associated panel 14. Each inner support 44 of the pair of inner supports 44 is coupled to an associated panel 14 of the pair of panels 14 adjacent to the first edge 16 of the associated panel 14. Each inner support 44 of the pair of inner supports 44 is couplable to an associated outer support 42 of the pair of outer supports 42 when the inner support 44 and the associated outer support 42 are positioned in the stored position 36 such that the inner support 44 and the associated outer support 42 are retained in the stored position 36.

A plurality of support pins 46 is provided for retaining each support 34 of the plurality of supports 34 in the stored position 36. Each support pin 46 of the plurality of support pins 46 is coupled to an associated inner support 44 of the pair of inner supports 44 and is biased to engage an associated outer support 42 of the pair of outer supports 42 to couple the associated inner support 44 with the associated outer support 42. In other embodiments, alternative connectors may be used to retain the supports 34 in the stored positions 36, such as threaded fasteners, magnetic fasteners, clips, or the like.

A plurality of support locks 48 is also provided to secure the supports 34 in the deployed positions 38. Each support lock 48 of the plurality of support locks 48 is coupled to the barrier 12 and an associated support 34 of the plurality of supports 34. Each support lock 48 of the plurality of support locks 48 is biased to lock the associated support 34 in the deployed position 38 and comprises a locking pin 50 and a bias member 52. The locking pin 50 is coupled to the associated support 34, and the bias member 52 is coupled to the barrier 12. The bias member 52 has a hole 53 for receiving the locking pin 50 and is biased to receive the locking pin 50 into the hole 53 and inhibit the locking pin 50 from moving out of the hole 53 via pivoting the associated support 34. Other locking mechanisms may be used for the support locks 48 such as threaded fasteners, latches, clips, or the like.

A barrier lock of 54 is coupled to the barrier 12 to selectively retain the barrier 12 in the expanded condition 24. The barrier lock of 54 comprises a pair of brackets 56 and a lock slider 58. Each bracket 56 of the pair of brackets 56 is coupled to an associated panel 14 of the pair of panels 14. The lock slider 58 is slidably coupled to and positioned within one bracket 56 of the pair of brackets 56. The lock slider 58 is slidable to insert into another bracket 56 of the pair of brackets 56, thereby preventing the pair of panels 14 from pivoting with respect to each other. Other locking mechanisms may be used for the barrier lock of 54 such as a threaded fastener, latch, clip, or the like.

In use, the barrier 12 may be positioned in the pickup truck bed 60 when in the expanded condition 24 to extend between the pair of sidewalls 64 of the pickup truck bed 60 and divide a cargo area 72 of the pickup truck bed 60 into a front section 74 and a rear section 76. The barrier 12 works to separate items stored in the cargo area 72 and may be used to retain items near a tailgate 70 of the pickup truck bed 60 while the pickup truck bed 60 is in motion to prevent spills and facilitate access to the items by individuals standing near the tailgate 70. The pivoting action of the panels 14 of the barrier 12 enables the barrier 12 to be inserted into the bay 82 from behind rather than by sliding the barrier 12 into the bay 82 from above. The panels 14 may form a V-shape to fit between inwardly protruding portions 78 of the sidewalls 64 and then be unfolded to cause the barrier 12 to be positioned in the expanded condition 24 within the bay 82. Finally, when not in use as means of dividing the cargo area 72 of the pickup truck, the plurality of supports 34 may be positioned in the respective deployed positions 38 to use the removable divider apparatus 10 as a table, bench, or similar support means.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A removable divider apparatus for a pickup truck bed, the apparatus comprising:

a barrier comprising a pair of panels, each panel of the pair of panels having a first edge and a second edge, each panel of the pair of panels having a first side and a second side being positioned opposite each other and each extending between the first edge and the second edge, the first edges of the pair of panels being pivotably interconnected, the barrier being positionable in an expanded condition in which the first sides of the pair of panels are oriented coplanar with each other and face a same direction with respect to each other;

a plurality of supports being coupled to the barrier, each support of the plurality of supports being coupled to an associated panel of the pair of panels, each support of the plurality of supports being pivotable between a stored position in which the support lies against the second side of an associated one of the pair of panels and a deployed position in which the support extends away from the panel, the plurality of supports being configured to space the barrier above a support surface when each support of the plurality of supports is positioned in the deployed position; and a plurality of support locks, each support lock of the plurality of support locks being coupled to the barrier and an associated support of the plurality of supports wherein each support lock of the plurality of support locks is biased to lock the associated support in the deployed position, each support lock of the plurality of support locks comprising:

a locking pin being coupled to the associated support; and a bias member being coupled to the barrier, the bias member having a hole for receiving the locking pin, the bias member being biased to receive the locking pin into the hole and inhibit the locking pin from moving out of the hole via pivoting the associated support.

2. The apparatus of claim 1, wherein the barrier is positionable in a folded condition in which the first sides of the pair of panels face opposite directions with respect to each other.

3. The apparatus of claim 1, wherein the barrier further comprises a pair of slider members, each slider member of the pair of slider members being coupled to an associated panel of the pair of panels, each slider member of the pair of slider members being movable alternately toward and away from the second edge of the associated panel, the pair of slider members being positionable to adjust a length of the barrier.

4. The apparatus of claim 3, wherein the length of the barrier when in the expanded condition is such that the barrier is configured to extend between a pair of sidewalls of the pickup truck bed.

5. The apparatus of claim 4, wherein a distal surface of each slider member of the pair of slider members with respect to the associated panel being shaped such that the distal surface is configured to conform to an inner surface of an associated sidewall of the pair of sidewalls of the pickup truck.

6. The apparatus of claim 3, wherein the distal surface of each slider member of the pair of slider members extends between and is oriented perpendicularly to a pair of opposing edges of the slider member.

7. The apparatus of claim 3, wherein the distal surface of each slider member of the pair of slider members extends between a pair of opposing edges of the slider member, the distal surface forming an acute angle with one of the pair of opposing edges and an obtuse angle with another of the pair of opposing edges.

8. The apparatus of claim 1, wherein the barrier is configured to be positioned in a bay formed by a pair of slots defined in the pair of sidewalls of the pickup truck when the barrier is positioned in the expanded condition.

9. The apparatus of claim 1, wherein each support of the plurality of supports comprises a pair of spaced legs.

10. The apparatus of claim 1, wherein the plurality of supports includes:

a pair of outer supports, each outer support of the pair of outer supports being coupled to an associated panel of the pair of panels adjacent to the second edge of the associated panel; and a pair of inner supports, each inner support of the pair of inner supports being coupled to an associated panel of the pair of panels adjacent to the first edge of the associated panel;

wherein each inner support of the pair of inner supports is couplable to an associated outer support of the pair of outer supports when the inner support and the associated outer support are positioned in the stored position such that the inner support and the associated outer support are retained in the stored position.

11. The apparatus of claim 10, further comprising a plurality of support pins, each support pin of the plurality of support pins being coupled to an associated inner support of the pair of inner supports, each support pin of the plurality of support pins being biased to engage an associated outer support of the pair of outer supports to couple the associated inner support with the associated outer support.

12. The apparatus of claim 1, further comprising a barrier lock being coupled to the barrier to selectively retain the barrier in the expanded condition.

13. The apparatus of claim 12, wherein the barrier lock comprises a pair of brackets and a lock slider, each bracket of the pair of brackets being coupled to an associated panel of the pair of panels, the lock slider being slidably coupled to and positioned within one bracket of the pair of brackets, the lock slider being slidable to insert into another bracket of the pair of brackets, thereby preventing the pair of panels from pivoting with respect to each other.

14. A removable divider apparatus for a pickup truck bed, the apparatus comprising:

a barrier comprising:

a pair of panels, each panel of the pair of panels having a first edge and a second edge, each panel of the pair of panels having a first side and a second side being positioned opposite each other and each extending between the first edge and the second edge, the first edges of the pair of panels being pivotably interconnected, the barrier being positionable in an expanded condition in which the first sides of the pair of panels are oriented coplanar with each other and face a same direction with respect to each other, the barrier being positionable in a folded condition in which the first sides of the pair of panels face opposite directions with respect to each other; and a pair of slider members, each slider member of the pair of slider members being coupled to an associated panel of the pair of panels, each slider member of the pair of slider members being movable alternately toward and away from the second edge of the associated panel, the pair of slider members being positionable to adjust a length of the barrier;

wherein the length of the barrier when in the expanded condition is such that the barrier is configured to extend between a pair of sidewalls of the pickup truck bed, a distal surface of each slider member of the pair of slider members with respect to the associated panel being shaped such that the distal surface is configured to conform to an inner surface of an associated sidewall of the pair of sidewalls of the pickup truck, the barrier being configured to be positioned in a bay formed by a pair of slots defined in the pair of sidewalls of the pickup truck when the barrier is positioned in the expanded condition;

a plurality of supports being coupled to the barrier, each support of the plurality of supports being coupled to an associated panel of the pair of panels, each support of the plurality of supports being pivotable between a stored position in which the support lies against the second side of an associated one of the pair of panels and a deployed position in which the support extends away from the panel, the plurality of supports being configured to space the barrier above a support surface when each support of the plurality of supports is positioned in the deployed position, each support of the plurality of supports comprising a pair of spaced legs, the plurality of supports including:

a pair of outer supports, each outer support of the pair of outer supports being coupled to an associated panel of the pair of panels adjacent to the second edge of the associated panel; and a pair of inner supports, each inner support of the pair of inner supports being coupled to an associated panel of the pair of panels adjacent to the first edge of the associated panel;

wherein each inner support of the pair of inner supports is couplable to an associated outer support of the pair of outer supports when the inner support and the associated outer support are positioned in the stored position such that the inner support and the associated outer support are retained in the stored position;

a plurality of support pins, each support pin of the plurality of support pins being coupled to an associated inner support of the pair of inner supports, each support pin of the plurality of support pins being biased to engage an associated outer support of the pair of outer supports to couple the associated inner support with the associated outer support;

a barrier lock being coupled to the barrier to selectively retain the barrier in the expanded condition, the barrier lock comprising a pair of brackets and a lock slider, each bracket of the pair of brackets being coupled to an associated panel of the pair of panels, the lock slider being slidably coupled to and positioned within one bracket of the pair of brackets, the lock slider being slidable to insert into another bracket of the pair of brackets, thereby preventing the pair of panels from pivoting with respect to each other; and a plurality of support locks, each support lock of the plurality of support locks being coupled to the barrier and an associated support of the plurality of supports, each support lock of the plurality of support locks being biased to lock the associated support in the deployed position, each support lock of the plurality of support locks comprising:

a locking pin being coupled to the associated support; and a bias member being coupled to the barrier, the bias member having a hole for receiving the locking pin, the bias member being biased to receive the locking pin into the hole and inhibit the locking pin from moving out of the hole via pivoting the associated support.

15. The apparatus of claim 14, wherein the distal surface of each slider member of the pair of slider members extends between and is oriented perpendicularly to a pair of opposing edges of the slider member.

16. The apparatus of claim 14, wherein the distal surface of each slider member of the pair of slider members extends between a pair of opposing edges of the slider member, the distal surface forming an acute angle with one of the pair of opposing edges and an obtuse angle with another of the pair of opposing edges.

* * * * *